United States Patent [19]

Lee

[11] 3,938,835

[45] Feb. 17, 1976

[54] DOUBLE ACTION WINTER ROAD CONDITIONER APPARATUS

[76] Inventor: Poy Lee, 52 Tennyson St., Somerville, Mass. 02145

[22] Filed: Sept. 12, 1974

[21] Appl. No.: 505,486

[52] U.S. Cl. .................. 291/34; 291/38; 222/443; 222/453
[51] Int. Cl.² ........................................ B60B 39/00
[58] Field of Search ............ 291/25, 34, 38, 14, 15; 222/144.5, 443, 453, 133

[56] References Cited
UNITED STATES PATENTS

| | | | |
|---|---|---|---|
| 640,081 | 12/1899 | Beman et al. | 222/443 X |
| 2,587,072 | 2/1952 | Sundheim | 291/34 |
| 2,759,638 | 8/1956 | Howard | 222/443 X |
| 3,134,521 | 5/1964 | Maasdan et al. | 222/443 |

Primary Examiner—John J. Love
Attorney, Agent, or Firm—Wolf, Greenfield & Sacks

[57] ABSTRACT

A hopper structure is disclosed for receiving sand from a main supply and selectively depositing the sand adjacent to one or more wheels of a motor vehicle. The sand deposition hopper is preferably arranged forward of the associated wheel and may be operated for traction sanding, braking sanding or the combination thereof.

6 Claims, 1 Drawing Figure

U.S. Patent  Feb. 17, 1976  3,938,835
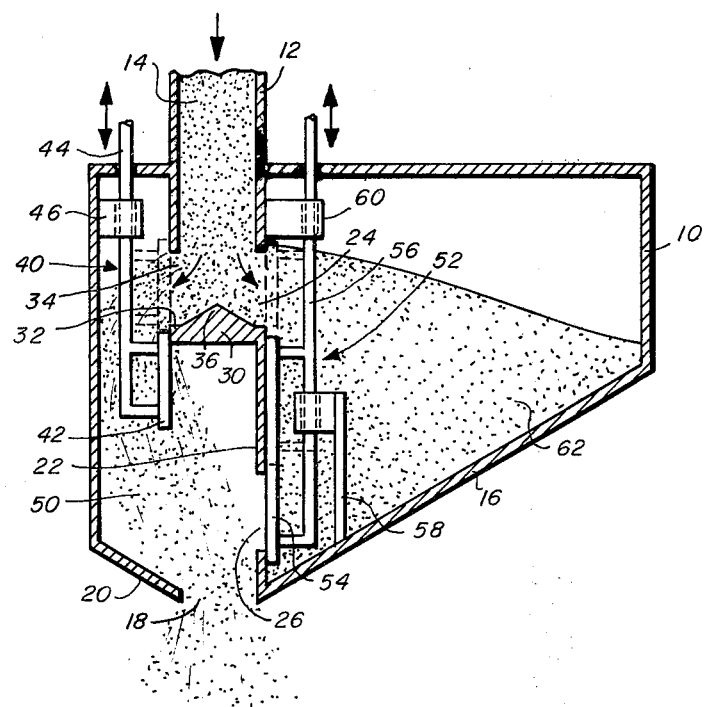

DOUBLE ACTION WINTER ROAD CONDITIONER APPARATUS

BACKGROUND OF THE INVENTION

The present invention relates, in general, to an apparatus for use with a motor vehicle for depositing sand adjacent to one or more wheels of the vehicle. More particularly, the present invention relates to a double action sand deposition apparatus that is selectively operable to provide traction sanding, braking sanding or both.

In my U.S. Pat. No. 3,774,945, there is disclosed a hopper arrangement for providing both traction sanding and braking sanding. Although this structure is more than adequate, there are some drawbacks associated therewith. For example, the prior art structure is rather bulky. Also, this prior art structure provides an excessive amount of sand storage thereby increasing the size of the hopper.

Accordingly, it is an object of the present invention to provide an improved sand deposition hopper of the type that is operated to selectively deposit either a small amount of sand upon application of the vehicle brakes or a larger amount of sand in an emergency situation.

Another object of the present invention is to provide a sand deposition hopper that is relatively compact, inexpensive to manufacture and that is efficient in operation.

SUMMARY OF THE INVENTION

To accomplish the foregoing and other objects of this invention, there is provided an apparatus for use with a motor vehicle. The apparatus is for depositing sand of a like material on the roadway adjacent at least one wheel of the vehicle. This apparatus, in one embodiment, comprises a tank housing associated with at least one wheel of the vehicle and having means for receiving sand and an outlet. In the disclosed embodiment, the means for receiving the sand is a tubular member extending into the housing and connecting at another end to a supply of sand or the like material. A wall separates the housing into first and second compartments. Preferably, one of the compartments has sand only selectively coupled therethrough while the other compartment functions as a reservior for a larger amount of sand. The structure further comprises a single action valve means operated to permit sand to flow from the sand receiving means through the first compartment to the outlet. This single action valve means may be operated from the vehicle brake pedal. There is also provided a double action valve means including two closure members and means commonly holding the closure members. When the double action valve means is in a first position, one closure member is open and the other closure member is closed to permit sand to flow from the sand receiving means to the second compartment and fill the second compartment. In this first position, the bottom member being closed prevents any sand deposition. When the double action valve means is in a second position, the one closure member is closed and the other closure member is open to permit sand to flow from the second compartment to the outlet. At the same time, with closure of one of the members, filling of the second compartment is prevented so that there will not be an excessive amount of sand deposited.

BRIEF DESCRIPTION OF THE DRAWING

Numerous other objects, features and advantages of the invention will now become apparent upon a reading of the following detailed description taken in conjunction with the accompanying drawing, which is a sole FIGURE in cross-section of the sand deposition hopper of the present invention.

DETAILED DESCRIPTION

My U.S. Pat. No. 3,774,945 shows a system for depositing sand adjacent the wheels of a vehicle. That patent teaches the placement of the storage tank associated with the system. The placement of the tank shown in the present application may be made in a similar manner or it may be supported in any suitable manner adjacent a wheel of the vehicle.

The sole FIGURE shows the tank housing 10 having a top tubular inlet 12 for carrying sand to the housing 10. The housing also has a slanted wall 16 terminating as bottom end in an outlet 18 through which the sand may be deposited on the roadway. A second slanted wall 20 defines, in part, the other side of the outlet 18.

Within the housing 10 there is disposed and suitably supported a vertical wall 22 defining at opposite ends passages 24 and 26. The wall 22 also has a horizontal section 30 extending from the top thereof. The lip 32 of section 30 defines with inlet 12 another passage 34. The section 30 also has a conical extension 36 for directing the sand toward the passages 24 and 32.

Disposed and supported in the housing 10 is a first single action valve 40 which comprises a slide bar 42 and an elongated operating or control rod 44. A guide 46 is provided suitably secured from a wall of the housing for guiding the vertical movement of the rod 44. The rod 44 may be operated in the manner shown in my co-pending application Ser. No. 385,419. This rod 44 may be operated either in a mechanical arrangement or from a hydraulic arrangement. Also, the rod may be operated selectively by application of the brakes or through some other switching arrangement.

In the drawing, the valve means 40 is shown in its open position wherein sand may travel through the inlet 12, via the passage 34, through the compartment 50 and out the outlet 18. The valve 40 is also shown, in dotted, in its closed position, preventing the flow of sand through the compartment 30 to the outlet.

The drawing also shows another valve means 52 which includes an elongated slide bar 54 and an elongated operating or control rod 56 which connects to opposite ends of the slide bar 54. A pair of suitably supported guides 58 and 60 support the valve means 56 which is of the double action type. This valve means is of the double action type in that it controls the flow of sand through the two passages 24 and 26. In this embodiment this control is provided by a single slide bar 54 but the same control could actually be provided by a pair of separate slide bars which are operated in unison.

In the position shown in the drawing, the slide bar covers the passage 26 and opens the passage 24 so that sand can flow to the compartment 62 and be accumulated therein as shown. The rod 56 may be operated in a manner similar to the rod 44 but is preferably operated only in an emergency situation in which case the slide bar moves upwardly to the position shown, in dotted, in the drawing. In this case, the passage 24 is closed and the passage 26 is open permitting preferably a larger amount of sand to be deposited through the passage 26 and the outlet 18 from the compartment 62.

Having described one embodiment of the present invention, it should now be apparent to those skilled in the art that there are numerous other embodiments and modifications of the one shown herein, all of which are contemplated as falling within the spirit and scope of the present invention. For example, the slide bars have been disclosed as operating in a vertical direction. Obviously, the structure could be modified so that these bars, one or both, operate in a vertical direction or any other direction.

What is claimed is:

1. An apparatus for use with a motor vehicle for improving the traction of the vehicle especially when traveling on ice covered highways or the like comprising;
    a housing associated with at least one wheel of the vehicle and having means defining an inlet port at the top of the housing for receiving sand and an outlet port at the bottom of the housing,
    a wall for separating the housing into first and second compartments and defining at least in part an inlet passage and an outlet passage to the second compartment,
    said receiving means of the housing defining a chamber having an inlet to the first compartment,
    first valve means operable to permit sand to flow from the sand receiving means, via the inlet to the first compartment and through the first compartment to the outlet in the housing,
    and second valve means including two closure members and means commonly supporting the closure members,
    whereby in a first position one closure member is open and the other closure member is closed to permit sand to flow from the sand receiving means via the inlet passage to the second compartment, and in a second position the one closure member is closed and the other closure member is open to permit sand to flow from the second compartment via the outlet passage to the outlet of the housing.

2. An apparatus for use with a motor vehicle for improving the traction of the vehicle especially when traveling on ice covered highways or the like comprising;
    a tank housing associated with at least one wheel of the vehicle and having means for receiving sand and an outlet,
    a wall for separating the housing into first and second compartments and defining at least in part an inlet passage and an outlet passage,
    single action valve means operable to permit sand to flow from the sand receiving means through the first compartment to the outlet in the tank housing,
    and double action valve means including two closure members defined by a unitary slide bar and an actuating rod for controlling the slide bar,
    whereby in the first lower position of the slide bar one closure member is open and the other closure member is closed to permit sand to flow from the sand receiving means via the inlet passage to the second compartment, and in a second upper position of the slide bar the one closure member is closed and the other closure member is open to permit sand to flow from the second compartment via the outlet passage to the outlet of the tank housing.

3. An apparatus for use with a motor vehicle for improving the traction of the vehicle especially when traveling on ice covered highways or the like comprising;
    a tank housing associated with at least one wheel of the vehicle and having means for receiving sand and an outlet,
    a wall for separating the housing into first and second compartments and defining at least in part an inlet passage and an outlet passage,
    single action valve means operable to permit sand to flow from the sand receiving means through the first compartment to the outlet in the tank housing
    and double action valve means including two closure members and means commonly holding the closure members,
    said wall having a top extension defining at least in part a passage associated with the single action valve means, said extension also defining a bottom of the sand receiving means, said sand receiving means including an inlet member extending into the housing,
    whereby in the first lower position of the means commonly holding one closure member is open and the other closure member is closed to permit sand to flow from the sand receiving means via the inlet passage to the second compartment, and in a second upper position of the means commonly holding the one closure member is closed and the other closure member is open to permit sand to flow from the second compartment via the outlet passage to the outlet of the tank housing.

4. The apparatus of claim 3 wherein said extension has means for directing sand through the passages to the two compartments.

5. The apparatus of claim 4 wherein said single action valve means includes an actuating rod and slide bar for covering the passage defined by the extension.

6. The apparatus of claim 5 wherein the double action valve means includes an actuating rod and the two closure members are defined by a unitary slide bar controlled from the actuating rod.

* * * * *